United States Patent
Das et al.

(10) Patent No.: US 9,868,903 B2
(45) Date of Patent: Jan. 16, 2018

(54) LIQUID PHASE ADDITIVE FOR USE IN THERMAL CRACKING PROCESS TO IMPROVE PRODUCT YIELDS

(71) Applicant: INDIAN OIL CORPORATION LTD., Mumbai, Maharashtra (IN)

(72) Inventors: Satyen Kumar Das, Faridabad (IN); Ponoly Ramachandran Pradeep, Faridabad (IN); Terapalli Hari Venkata Devi Prasad, Faridabad (IN); Jagdev Kumar Dixit, Faridabad (IN); Gautam Thapa, Faridabad (IN); Ram Mohan Thakur, Faridabad (IN); Vinod Kumar Sharma, Faridabad (IN); Debasis Bhattacharyya, Faridabad (IN); Suresh Kumar Puri, Faridabad (IN); Anurag Ateet Gupta, Faridabad (IN); Brijesh Kumar, Faridabad (IN); Biswapriya Das, Faridabad (IN); Ravinder Kumar Malhotra, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 209 days.

(21) Appl. No.: 14/668,446

(22) Filed: Mar. 25, 2015

(65) Prior Publication Data

US 2015/0275084 A1 Oct. 1, 2015

(30) Foreign Application Priority Data

Mar. 31, 2014 (IN) .......................... 1226/MUM/2014

(51) Int. Cl.
*C10G 9/00* (2006.01)
*C09K 15/28* (2006.01)
*C10G 75/04* (2006.01)

(52) U.S. Cl.
CPC ................ *C09K 15/28* (2013.01); *C10G 9/00* (2013.01); *C10G 9/005* (2013.01); *C10G 75/04* (2013.01); *C10G 2300/107* (2013.01); *C10G 2300/1033* (2013.01)

(58) Field of Classification Search
CPC .......... C09K 15/28; C10G 75/04; C10G 9/00; C10G 9/005; C10G 2300/107; C10G 2300/1033
See application file for complete search history.

(56) References Cited

U.S. PATENT DOCUMENTS

| 6,048,904 A * | 4/2000 | Wiehe | C07C 309/31 106/278 |
| 6,193,875 B1 * | 2/2001 | Pereira | C10B 57/06 208/121 |
| 7,425,259 B2 | 9/2008 | Stark et al. | |

* cited by examiner

*Primary Examiner* — Randy Boyer
*Assistant Examiner* — Juan Valencia
(74) *Attorney, Agent, or Firm* — Maschoff Brennan

(57) ABSTRACT

The present invention relates to a liquid phase additive comprising an alkyl nitrate; a petroleum sulphonates; an aliphatic, aromatic, cyclohexylamines or hetroalkylated lower amines; a hindered phenol based compounds; a phosphate esters and an aliphatic alcohols for use in delayed coking process with decreased coke yield and increased yield of liquid and/or gaseous product and a process for preparing the liquid phase additive. The present invention also relates to a process for thermal cracking of petroleum residue producing petroleum coke and lighter hydrocarbon products by using liquid phase additive.

17 Claims, No Drawings

LIQUID PHASE ADDITIVE FOR USE IN THERMAL CRACKING PROCESS TO IMPROVE PRODUCT YIELDS

FIELD OF THE INVENTION

The present invention relates to a liquid phase additive for use in delayed coking process with decreased coke yield and increased yield of liquid and/or gaseous product and a process for preparing the liquid phase additive. The present invention also relates to a process for thermal cracking of petroleum residue producing petroleum coke and lighter hydrocarbon products by using liquid phase additive.

BACKGROUND OF THE INVENTION

U.S. Pat. No. 6,193,875 discloses an antiflocculant type organometallic additive and the method of preparation of the same. The additive is prepared by creating an emulsion of a metallic compound dispersion in water and hydrocarbon. The metal salt can be compounds of Alkaline earth metals. Though U.S. Pat. No. 6,193,875 mentions a reduction in coke yield with use of additive, the experiments have been carried out at a coking temperature of 540° C., which is much higher than the normal coking temperature used in Delayed Coking Unit (DCU). Therefore, the effectiveness of additives at a normal coking temperature of 480-500° C. is not conclusive.

U.S. Pat. No. 6,048,904 discloses an asphaltene dispersion additive containing an aromatic, sulphonic head and an alkyl tail containing 16 carbon atoms or more and at least one branch of methyl or longer alkyl group. Reduction in coke is not mentioned. In U.S. Pat. No. 6,048,904, an asphaltene dispersant additive has been described, which claims to help the asphaltenes to disperse in oil and reduce the fouling in the furnaces. The residence time in the furnace of Delayed coking unit is much lesser than the residence time of hydrocarbons in the coke drum, where coking reactions take place. Though this additive may help to reduce the coke formation inside the furnace, the effectiveness of the additive may reduce when it is subjected to the higher residence time inside the coke drums.

U.S. Pat. No. 7,425,259 discloses a method for improving the liquid yields during thermal cracking using additives. Additives such as metal overbases of Ca, Mg, Strontium, Al, Zn, Si, Barium were used.

In light of the above there still exists a need for an additive for use in a delayed coking process for decreasing coke yield and increasing yield of liquid and/or gaseous product.

SUMMARY OF THE INVENTION

Accordingly, the present invention provides a liquid phase additive comprising:
(i) an alkyl nitrate;
(ii) a petroleum sulphonates;
(iii) an aliphatic, aromatic, cyclohexylamines or hetroalkylated lower amines;
(iv) a hindered phenol based compounds;
(v) a phosphate esters; and
(vi) an aliphatic alcohols.

In an embodiment of the present invention, the alkyl nitrate is selected from 2-ethylhexyl nitrate and isopropyl nitrate.

In yet another embodiment of the present invention, the petroleum sulphonates is selected from calcium petroleum sulphonates of less than 100 TBN.

In yet another embodiment of the present invention, the aliphatic, aromatic, cyclohexylamines or hetroalkylated lower amines are selected from dimethyl-cyclohexylamine, dibutylamine, mono & di-ethanol amine, and benzylamine.

In yet another embodiment of the present invention, the hindered phenol based compounds is selected from 2,6 ditertiary-butyl-4-methyl-phenol, 2,4 dimethyl-6-tertiary-butyl-phenol, and 2,6 ditertiary-butyl-phenol.

In yet another embodiment of the present invention, the phosphate esters is selected from trialkyl, and triaryl phosphates.

In yet another embodiment of the present invention, the aliphatic alcohols is selected from butanol, hexanol, 2-ethylhexanol and mixtures thereof.

In yet another embodiment of the present invention, an amount of the alkyl nitrate is in the range of 30 to 90% w/w, preferably in the range of 60 to 90% w/w.

In yet another embodiment of the present invention, an amount of the petroleum sulphonates is in the range of 2 to 30% w/w, preferably in the range of 5 to 15% w/w.

In yet another embodiment of the present invention, an amount of the aliphatic, aromatic, cyclohexylamines or hetroalkylated lower amines is in the range of 1 to 10% w/w, preferably in the range of 2 to 7% w/w.

In yet another embodiment of the present invention, an amount of the hindered phenol based compounds is in the range of 0.1-5% w/w, preferably in the range of 0.1 to 2% w/w.

In yet another embodiment of the present invention, an amount of phosphate esters is in the range of 1-15% w/w, preferably in the range of 2 to 8% w/w.

In yet another embodiment of the present invention, an amount of the aliphatic alcohols is in the range of 1-20% w/w, preferably in the range of 5 to 15% w/w.

The present invention also provides a process for preparing a liquid phase additive, comprising:
(i) providing an alkyl nitrate in a reactor and stirring the same;
(ii) adding a petroleum sulphonates; an aliphatic, aromatic, cyclohexylamines or hetroalkylated lower amines; a hindered phenol based compounds; a phosphate esters; and an aliphatic alcohols, in to the reactor of step (i) while stirring;
(iii) heating the contents of step (ii) to 40-50° C. and stirring for 30 minutes; and
(iv) cooling the contents of step (iii) to ambient temperature to obtain the liquid phase additive.

The present invention also provides a process for thermal cracking of petroleum residue by delayed coking, the process comprising the steps of:
(a) feeding a hydrocarbon feedstock in a delayed coker reactor unit,
(b) adding a liquid phase additive comprising an alkyl nitrate; a petroleum sulphonates; an aliphatic, aromatic, cyclohexylamines or hetroalkylated lower amines; a hindered phenol based compounds; a phosphate esters; and an aliphatic alcohols, and
(c) heating the reactor at a predetermined heating rate.

In an embodiment of the present invention, the liquid phase additive is added in an amount of 100 to 20000 ppm, preferably in the range of 1000 to 10000 ppm; and more preferably in the range of 1000 ppm to 3000 ppm.

In yet another embodiment of the present invention, the hydrocarbon feed stock has Conradson carbon residue content above 4 wt % and minimum density of 0.9 g/cc.

DETAILED DESCRIPTION OF THE INVENTION

While the invention is susceptible to various modifications and alternative forms, specific embodiment thereof will be described in detail below. It should be understood, however that it is not intended to limit the invention to the particular forms disclosed, but on the contrary, the invention is to cover all modifications, equivalents, and alternative falling within the scope of the invention as defined by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The terms "comprises", "comprising", or any other variations thereof, are intended to cover a non-exclusive inclusion, such that one or more processes or composition/s or systems or methods proceeded by "comprises . . . a" does not, without more constraints, preclude the existence of other processes, sub-processes, composition, sub-compositions, minor or major compositions or other elements or other structures or additional processes or compositions or additional elements or additional features or additional characteristics or additional attributes.

The present invention discloses a liquid phase additive containing synergistic combination of solvents & a co-solvent potentiated with an alkyl nitrate, a petroleum sulphonates, an aliphatic, aromatic, cyclohexylamines or hetroalkylated lower amines, a hindered phenol based compounds, a phosphate esters and an aliphatic alcohols and a process for preparing the liquid phase additive. The present invention also relates to a process for thermal cracking of petroleum residue, converting the petroleum residue into liquid and gaseous product streams and solid, carbonaceous petroleum coke as a by-product. Particularly the invention discloses a process for thermal cracking of petroleum residue by delayed coking using the liquid phase additive.

One of the advantages of using liquid phase additives is the good miscibility of liquid additive dispersion with hydrocarbon feedstock. Another advantage of liquid phase additive is its easy handling & processing. Carried over liquid additive may improve stability of coker fuel oil. Stabilization of asphaltenes may reduce coking in furnace tubes, increase furnace run length. No increase in 'ash content' of coke.

An aspect of the invention discloses the composition of a liquid phase additive for delayed coking of petroleum residue with increased product yield and decreased coke yield.

Another aspect of the present invention discloses thermal cracking of hydrocarbon feedstocks; with Conradson carbon residue content of the feedstock being preferably above 4 wt % and minimum density of 0.9 g/cc, using a liquid phase additive.

The petroleum residue used according to the present invention includes, but is not necessarily limited to, vacuum residue, atmospheric residue, deasphalted oil, shale oil, coal tar, clarified oil, residual oils, thermal pyrolytic tar, visbreaker streams, heavy waxy distillates, foots oil, slop oil or blends of such hydrocarbons. The petroleum residue used according to the present invention may be hydrotreated for removal of sulfur and metals before feeding into the process, depending on the requirement.

Solvent used in accordance with this invention includes alkyl nitrates such as isopropyl nitrate, 2-ethylhexyl nitrate, and preferred solvent is 2 ethylhexyl nitrate. Co-solvent used in accordance with this invention includes aliphatic alcohols from C1 to C8 and preferred co-solvent is C8 alcohol.

Alkyl nitrate based compounds used in accordance with this invention include 2-ethylhexyl nitrate or isopropyl nitrate, in the range of 30-90% w/w preferably in the range of 60 to 90% w/w. In an embodiment, the preferred alkyl nitrate is 2-ethylhexyl nitrate.

Petroleum sulphonates used in accordance with the present invention include calcium petroleum sulphonates of less than 100 TBN in the range of 2-30% w/w, preferably in the range of 5 to 15% w/w. In an embodiment, the preferred petroleum sulphonates is calcium petroleum sulphonates of 23 TBN.

Aliphatic, aromatic, cyclohexylamines or hetroalkylated lower amines that can be used in accordance with the present invention includes, without limitation, diethyl-cyclohexylamine, dibutylamine, mono & di-ethanol amine, benzylamine in the range of 1-10% w/w, preferably in the range of 2 to 7% w/w. In an embodiment, the preferred amine is dimethyl cyclohexylamine.

Hindered phenol based compounds used in accordance with the present invention include 2,6 ditertiary-butyl-4-methyl-phenol, 2,4 dimethyl-6-tertiary-butyl-phenol, 2,6 ditertiary-butyl-phenol and their mixtures in various proportion in the range of 0.1-5% w/w, preferably in the range of 0.1 to 2% w/w. In an embodiment, the preferred hindered phenol based compound is 2,6 ditertiary-butyl-4-methyl-phenol.

Phosphate esters used herein include trialkyl or triaryl phosphates in the range of 1-15% w/w, preferably in the range of 2 to 8% w/w. In an embodiment, the preferred phosphate ester is triaryl phosphates.

Aliphatic alcohols used in accordance to present invention include butanol, hexanol, 2-ethylhexanol, or their mixtures in various proportions in the range of 1-20% w/w, preferably in the range of 5 to 15% w/w. In an embodiment, the preferred aliphatic alcohol is 2-ethylhexanol.

The process of the present invention may use any desired operating temperature ranging from 450 to 600° C., and desired operating pressure inside coke drum ranging from 0.5 to 5 Kg/cm$^2$. The use of the liquid phase additive causes a reduction in the coke yield and increase in the hydrocarbon product yield.

Contacting of the liquid phase additive with the feedstock is achieved by mixing the additive at a predetermined flow rate into the hydrocarbon feedstock before entering the feed heater furnace, in the transfer line or in the feed surge drum or storage tank. According to invention, the liquid phase additive is contacted with the hydrocarbon feedstock in the range of 100 to 20000 ppm, preferably in the range of 1000 to 10000 ppm and more preferably in the range of 1000 ppm to 3000 ppm. The additive may be stored in a vessel or a tank or any other suitable storage equipment and the additive supply pump may take suction from the storage vessel. Various types of pumps are available for those who know the art, for supply of chemical additives at a controlled flow rate to the injection point. For injection of additive in the pipe line, injection quills of suitable sizes may be used, as is normally done in the case of liquid chemical injection.

The additive can be injected at a single or multiple desired locations, at same or different flow rates. Mixing equipments like inline mixers, blenders etc. may be also used for homogeneous mixing of the additive with the hydrocarbon feedstock.

Having described the basic aspects of the present invention, the following non-limiting examples illustrate specific embodiment thereof. However, they are, not intended to be limiting the scope of present invention in any way.

Example I

Method of Preparing the Liquid Phase Additive Composition

An alkyl nitrate is taken in a beaker and then started stirring, thereafter petroleum sulphonates; aliphatic alcohol; phosphate ester; an aliphatic, aromatic, cyclohexylamines or hetroalkylated lower amines; and hindered phenol have been added in to the beaker. The contents were heated to 40-50° C. and stirrer for 30 minutes. Finally the contents were cooled to ambient temperature.

The following Table 1 discloses the examples 1-7 for liquid phase additive.

TABLE 1

| Components | Claimed Range | Ex. 1 | Ex. 2 | Ex. 3 | Ex. 4 | Ex. 5 | Ex. 6 | Ex. 7 |
|---|---|---|---|---|---|---|---|---|
| Alkyl Nitrate | 30-90% w/w | 71 | 26 | 71 | 71.70 | 71.95 | 71.90 | 72.70 |
| Petroleum Sulphonates | 2-30% w/w | 10 | 28 | 1 | 10.70 | 10 | 10.90 | 11.70 |
| Aliphatic, aromatic, cyclohexylamines or hetroalkylated lower amines | 1-10% | 4 | 9 | 5.89 | 0.50 | 4 | 4.90 | 5.70 |
| Hindered phenol based compounds | 0.1-5% w/w | 1 | 4 | 1.47 | 1.70 | 0.05 | 1.90 | 2.70 |
| Phosphate esters | 1-15% w/w | 5 | 14 | 7.37 | 5.70 | 5 | 0.50 | 6.70 |
| Aliphatic alcohols | 1-20% | 9 | 19 | 13.26 | 9.70 | 9 | 9.90 | 0.50 |

Example II

Experiment was conducted in a 'Micro coker reactor unit' in which the hydrocarbon feedstock to be processed is loaded before the start of experiment. The reactor is heated into the desired reaction temperature using a predetermined heating rate using an electric furnace. The liquid products generated in the coking reaction are collected in the liquid collection vessel and the gaseous products are routed to vent.

Following three experiments were carried out in the micro coker unit:
1. Vacuum residue (VR) feedstock (Base case).
2. Vacuum residue feedstock with 1000 ppm liquid phase additive.
3. Vacuum residue feedstock with 3000 ppm liquid phase additive.

Properties of feedstocks used in experiments for exemplifying the present invention are given in Table-2.

TABLE 2

Properties of feedstock used in experiments

| Feed Properties | Unit | Value |
|---|---|---|
| CCR | Wt % | 22.05 |
| Asphaltene | Wt % | 7.1 |
| Sulfur | Wt % | 5.18 |

TABLE 2-continued

Properties of feedstock used in experiments

| Feed Properties | Unit | Value |
|---|---|---|
| Na | ppm | 4 |
| Mg | ppm | 1 |
| Ni | ppm | 91 |
| V | ppm | 146 |
| Fe | ppm | 10 |
| Paraffins | Wt % | 43.5 |
| Aromatics | Wt % | 56.5 |
| D 2887 Distillation, IBP/30/50/90/EP | Vol %/OC | 514/590/608/642/652 |

TABLE 3

Experimental conditions in Micro coker reactor

| Parameter | unit | Value |
|---|---|---|
| Reactor internal temperature (RIT) | ° C. | 486 |
| Reactor pressure | kg/cm2 | 1.05 |
| Reaction time (after attaining RIT) | min | 120 |

Results from Experiment

Reduction in coke yield of 20.45 wt % observed with 3000 ppm liquid phase additive of example 1.

TABLE 4

Micro coker experimental results of Example 1

| Experiment | VR | VR + 1000 ppm liquid phase additive | VR + 3000 ppm liquid phase additive |
|---|---|---|---|
| Coke, wt % | 34.97 | 34.92 | 27.82 |
| ΔCoke, wt % | — | −0.14 | −20.45 |

TABLE 5

Micro coker experimental results of Examples 1-7

| Experiment | Coke, wt % | Liquid yield, wt % | Gas yield, wt % | ΔCoke yield w.r.t. Base case, wt % |
|---|---|---|---|---|
| VR without additive | 34.97 | 50.04 | 14.99 | 0 |
| VR + 3000 ppm liquid phase additive given in Example 1 | 27.82 | 55.4 | 16.78 | −20.45 |
| VR + 3000 ppm liquid phase additive given in Example 2 | 28.80 | 54.8 | 16.40 | −17.64 |
| VR + 3000 ppm liquid phase additive given in Example 3 | 29.99 | 53.2 | 16.81 | −14.25 |
| VR + 3000 ppm liquid phase additive given in Example 4 | 29.80 | 51.4 | 18.80 | −14.78 |
| VR + 3000 ppm liquid phase additive given in Example 5 | 28.50 | 54.8 | 16.70 | −18.50 |
| VR + 3000 ppm liquid phase additive given in Example 6 | 29.85 | 53.5 | 16.65 | −14.64 |
| VR + 3000 ppm liquid phase additive given in Example 7 | 28.54 | 53.47 | 17.99 | −18.39 |

We claim:
1. A liquid phase additive comprising:
   (i) an alkyl nitrate;
   (ii) a petroleum sulphonates;
   (iii) an aliphatic, aromatic, cyclohexylamines or hetroalkylated lower amines;
   (iv) a hindered phenol based compounds;

(v) a phosphate esters; and
(vi) an aliphatic alcohols.

2. The additive as claimed in claim 1, wherein the alkyl nitrate is selected from 2-ethylhexyl nitrate and isopropyl nitrate.

3. The additive as claimed in claim 1, wherein the petroleum sulphonates is selected from calcium petroleum sulphonates of less than 100 TBN.

4. The additive as claimed in claim 1, wherein the aliphatic, aromatic, cyclohexylamines or hetroalkylated lower amines are selected from dimethyl-cyclohexylamine, dibutylamine, mono & di-ethanol amine, and benzylamine.

5. The additive as claimed in claim 1, wherein the hindered phenol based compounds is selected from 2,6 ditertiary-butyl-4-methyl-phenol, 2,4 dimethyl-6-tertiary-butyl-phenol, and 2,6 ditertiary-butyl-phenol.

6. The additive as claimed in claim 1, wherein the phosphate esters is selected from trialkyl, and triaryl phosphates.

7. The additive as claimed in claim 1, wherein the aliphatic alcohols is selected from butanol, hexanol, 2-ethylhexanol and mixtures thereof.

8. The additive as claimed in claim 1, wherein an amount of the alkyl nitrate is in the range of 30 to 90% w/w.

9. The additive as claimed in claim 1, wherein an amount of the petroleum sulphonates is in the range of 2 to 30% w/w.

10. The additive as claimed in claim 1, wherein an amount of the aliphatic, aromatic, cyclohexylamines or hetroalkylated lower amines is in the range of 1 to 10% w/w.

11. The additive as claimed in claim 1, wherein an amount of the hindered phenol based compounds is in the range of 0.1-5% w/w.

12. The additive as claimed in claim 1, wherein an amount of phosphate esters is in the range of 1-15% w/w.

13. The additive as claimed in claim 1, wherein an amount of the aliphatic alcohols is in the range of 1-20% w/w.

14. A process for preparing a liquid phase additive, comprising
(i) providing an alkyl nitrate in a reactor and stirring the same;
(ii) adding a petroleum sulphonates; an aliphatic, aromatic, cyclohexylamines or hetroalkylated lower amines; a hindered phenol based compounds; a phosphate esters; and an aliphatic alcohols, in to the reactor of step (i) while stirring;
(iii) heating the contents of step (ii) to 40-50° C. and stirring for 30 minutes; and
(iv) cooling the contents of step (iii) to ambient temperature to obtain the liquid phase additive.

15. A process for thermal cracking of petroleum residue by delayed coking, the process comprising the steps of:
(a) feeding a hydrocarbon feedstock in a delayed coker reactor unit,
(b) adding a liquid phase additive comprising an alkyl nitrate; a petroleum sulphonates; an aliphatic, aromatic, cyclohexylamines or hetroalkylated lower amines; a hindered phenol based compounds; a phosphate esters; and an aliphatic alcohols, and
(c) heating the reactor at a predetermined heating rate.

16. The process as claimed in claim 15, wherein the liquid phase additive is added in an amount of 100 to 20000 ppm.

17. The process as claimed in claim 15, wherein the hydrocarbon feed stock has Conradson carbon residue content above 4 wt % and minimum density of 0.9 g/cc.

* * * * *